US010016086B2

(12) United States Patent
Castleberry

(10) Patent No.: US 10,016,086 B2
(45) Date of Patent: Jul. 10, 2018

(54) APPARATUS, SYSTEM AND METHOD OF REMOVING A SINGLE SERVE BEVERAGE POD OR CAPSULE FROM A BREWER OR BEVERAGE DISPENSING MACHINE

(71) Applicant: Newco Enterprises, Inc., St. Charles, MO (US)

(72) Inventor: Billy J. Castleberry, Lubbock, TX (US)

(73) Assignee: Newco Enterprises, Inc., St. Charles, MO (US)

( * ) Notice: Subject to any disclaimer, the term of this patent is extended or adjusted under 35 U.S.C. 154(b) by 262 days.

(21) Appl. No.: 14/744,805

(22) Filed: Jun. 19, 2015

(65) Prior Publication Data

US 2015/0366396 A1    Dec. 24, 2015

Related U.S. Application Data

(60) Provisional application No. 62/014,467, filed on Jun. 19, 2014.

(51) Int. Cl.
*A47J 31/36* (2006.01)

(52) U.S. Cl.
CPC ................. *A47J 31/3638* (2013.01)

(58) Field of Classification Search
CPC ........... A47J 31/3604; A47J 31/3623–31/3638
USPC ....................... 99/279, 280, 283, 289 R, 295
See application file for complete search history.

(56) References Cited

U.S. PATENT DOCUMENTS

| 6,182,554 | B1 | 2/2001 | Beaulieu et al. |
| 6,345,570 | B1 | 2/2002 | Santi |
| 8,490,542 | B2 | 7/2013 | Webster et al. |
| 2005/0095158 | A1* | 5/2005 | Kirschner ........... A47J 31/3633 417/572 |
| 2012/0312174 | A1* | 12/2012 | Lambert ............ A47J 31/3638 99/295 |
| 2015/0289706 | A1* | 10/2015 | Flick .................... A47J 31/407 99/295 |

FOREIGN PATENT DOCUMENTS

| EP | 1486150 A2 | 12/2004 |
| WO | 2007045553 A1 | 4/2007 |

* cited by examiner

*Primary Examiner* — Michael Laflame, Jr.
(74) *Attorney, Agent, or Firm* — Matthews Edwards LLC

(57) ABSTRACT

An apparatus, system, and method of ejecting or removing a beverage pod or capsule from a brewer or other beverage dispensing machine, utilizes the release of a predetermined quantity of stored energy triggered or commenced by an operator action, to automatically rapidly move an element holding the pod or capsule from a brewing or beverage preparing area in a predetermined manner to eject the pod or capsule, then return the element absent the pod or capsule to the brewing or beverage preparing area by a suitable action, thereby eliminating variances in the disposal resulting from inconsistent operator action, and the cost and complexity of motor driven apparatus for performing the disposal and/or return actions.

18 Claims, 24 Drawing Sheets

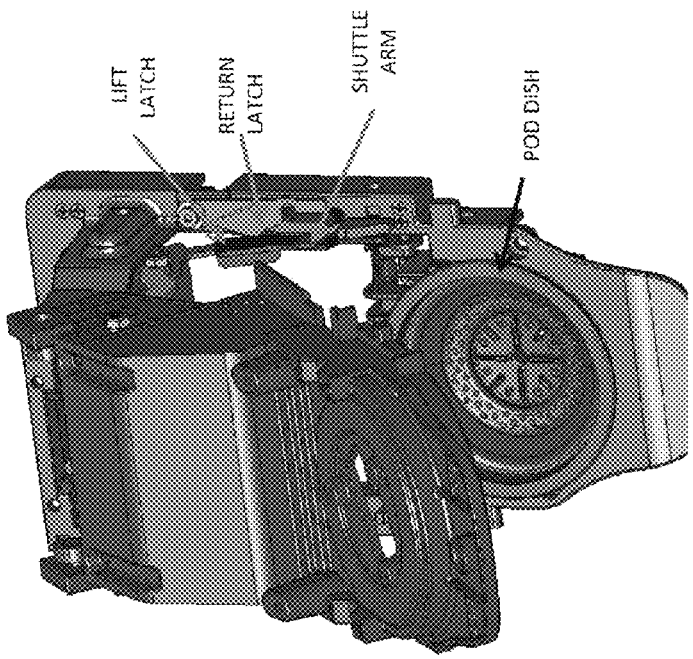
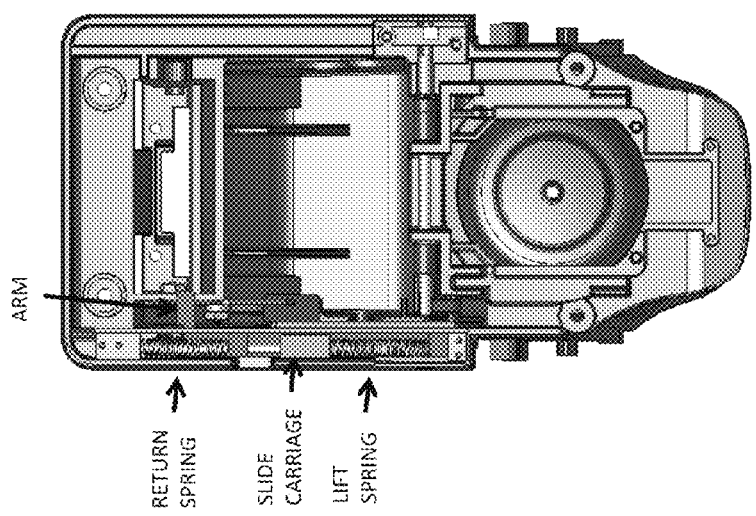
SPRING LOADED COFFEE EJECTION METHOD
COVER RAISED
NOT ENERGIZED
FIG. 11

FIG. 15 SEQUENCE 1 BOTTOM VIEW

SEQUENCE 2
SIDE VIEW

SEQUENCE 2
TOP VIEW

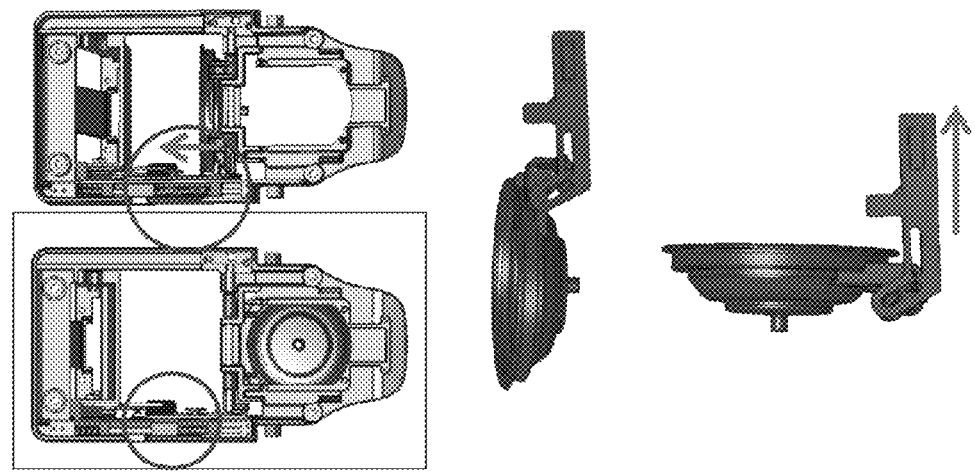
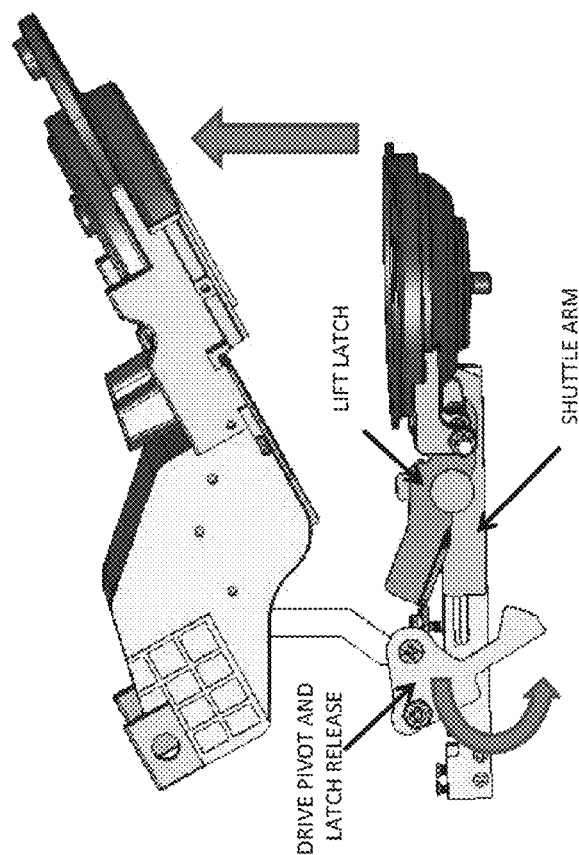
SEQUENCE 3
SIDE VIEW
FIG. 19

SEQUENCE 4
SIDE VIEW

SEQUENCE 4
SIDE VIEW

SEQUENCE 4
TOP VIEW

COVER RAISED
NOT ENERGIZED

APPARATUS, SYSTEM AND METHOD OF REMOVING A SINGLE SERVE BEVERAGE POD OR CAPSULE FROM A BREWER OR BEVERAGE DISPENSING MACHINE

This application claims the benefit of U.S. Provisional Application No. 62/014,467, filed Jun. 19, 2014.

TECHNICAL FIELD

This invention relates generally to an apparatus, system, and method of ejecting or removing a beverage pod or capsule from a brewer or other beverage dispensing machine, that utilizes the release of a predetermined quantity of stored energy triggered or commenced by an operator action, to automatically rapidly move an element holding the pod or capsule from a brewing or beverage preparing area in a predetermined manner to eject the pod or capsule, then return the element absent the pod or capsule to the brewing or beverage preparing area by a suitable action, thereby eliminating variances in the disposal resulting from inconsistent operator action, and the cost and complexity of motor driven apparatus for performing the disposal and/or return actions.

BACKGROUND ART

The disclosure of U.S. Provisional Application No. 62/014,467, filed Jun. 19, 2014, is hereby incorporated herein in its entirety by reference.

In the single serve beverage dispensing machine art, particularly machines configured to brew single serving packets, pods, or capsules of coffee, tea, and other beverages, it is well known to provide a manner of automatically ejecting used or spent pods, capsules, or packages, which may be empty or contain residual beverage media, e.g., coffee grounds, tea leaves, etc. Apparatus for effecting such disposal fall generally within two categories, motor driven or powered apparatus, and operator driven. Reference generally in regard to the first category, Webster et al, U.S. Pat. No. 8,490,542. Reference in regard to the latter category, Beaulieu, et al. U.S. Pat. No. 6,182,554; Santi U.S. Pat. No. 6,345,570; Hale European Patent EP1486150 A2; and Ariete International Patent Application Publication Serial No. WO2007045553. The first category is generally satisfactory in operation, but is costly and complex. An observed shortcoming of the second category is that the force of the ejecting action is largely dependent on or subject to the action of the human operator in operating the driving mechanism, whether it be when opening the brewing chamber to insert a new pod or capsule, or some other ejection action. In particular, if the driving mechanism is operated slowly, sluggishly, or not sufficiently forcefully, proper ejection may not occur. The used pod or capsule may only be partially ejected, or not at all, with possible jamming or malfunction of the machine, requiring repeating the action and/or cleaning the associated machine components.

Thus, what is sought is a manner of providing automatic ejection or removal of used or spent pods, capsules, and the like, from a beverage dispensing machine, that overcomes one or more of the disadvantages and shortcomings of the known machines and apparatus.

SUMMARY OF THE INVENTION

What is disclosed is a apparatus, system, and method of ejecting or removing a beverage pod, capsule, package, cup, etc. (hereinafter commonly referred to by the terms pod and/or capsule) from a brewer or other beverage dispensing machine that overcomes one or more of the disadvantages and shortcomings of the known machines and apparatus.

According to a preferred aspect, the invention provides a mechanism that utilizes the release of a predetermined quantity of stored energy triggered or commenced by an operator action, to automatically rapidly move an element holding the pod or capsule from a brewing or beverage preparing area in a predetermined manner to eject the pod or capsule, then return the element absent the pod or capsule to the brewing or beverage preparing area by a suitable action, thereby eliminating variances in the disposal resulting from inconsistent operator action, and the cost and complexity of motor driven apparatus for performing the disposal and/or return function.

According to another preferred aspect, the mechanism is associated with elements of the beverage preparing elements of the machine. In one embodiment, the mechanism is associated with elements for opening the beverage preparing aspects of the machine, particularly a brewing chamber, and more particularly a brewing dish or receptacle for holding the pod or capsule during the brewing or other beverage preparation.

The mechanism preferably comprises at least one, non-powered first driving element configured to store a predetermined first quantity of motive energy, which quantity is determined to be sufficient for very quickly moving the brewing dish or receptacle, or other element capable of carrying the used pod or capsule, such as an ejection ring or the like, in a manner and a direction for removing it from the brewing or preparation area to a disposal area, such as, but not limited to, a disposal chute or receptacle associated with or contained within the machine. The first driving element can comprise, as a non-limiting example, a spring of a variety of types, e.g., compression, tension, torsion, clock type, a charged gas cylinder, resilient biasing element, e.g., compressible or stretchable polymeric body or band, or the like.

The mechanism preferably comprises at least one, non-powered second driving element configured to store a predetermined second quantity of motive energy, which quantity is determined to be sufficient for very quickly moving the brewing dish or receptacle, or other element capable of carrying the used pod or capsule, in a manner and a direction for returning it to the brewing or preparation area. The second driving element can comprise, as a non-limiting example, a spring of a variety of types, e.g., compression, tension, torsion, clock type, a charged gas cylinder, resilient biasing element, e.g., compressible or stretchable polymeric body or band, or the like, and need not be of the same type as the first driving element.

Preferably, the first and second driving elements will be charged with the respective quantity of energy by some action, either as a dedicated action, or in conjunction with another task, such as closing of the brewing chamber or beverage preparation area, which may be manually or automatically accomplished. Alternatively, a dedicated action can be required, such as the movement or cocking of a lever. In the context of the known prior art beverage machines, the brewing or beverage preparation chamber or area is typically opened to insert a new pod or capsule, and closed, and this closing action can provide a suitable charging action, particularly desirable if in a downward direction so as utilize an ability to translate the force of gravity into at least a portion of the charging energy.

The mechanism also comprises a latching mechanism or mechanisms configured to hold the driving elements in the charged or stored energy state while brewing or other beverage preparation occurs. For example, if compression springs, compressible polymeric element—the stored energy state will be a compressed state; if tension springs or tensionable polymeric element, it will be a tensioned state. As a preferred embodiment, a first latching or release mechanism will release the first driving element so as to release its stored energy in the predetermined manner, responsive to some predetermined operator action or condition, desirably involving the opening of the brewing chamber. This can be initiated by action such as pushing of a button or manual opening. The operation of the first driving element to eject the used pod or capsule will then be rapid, and autonomous and free or independent of further operator action. Thus, if the operator should open the brewing chamber slowly, weakly, or jerkily, it will have no effect on the ejection of the used pod or capsule as long as the chamber is opened to a sufficient extent to initiate the stored energy release and allow the required movements of the element holding the used pod or capsule.

During the operation of the first driving element, the second driving element will remain at least largely in its stored energy state, but will be released automatically by an appropriate timed action, such as the movement of the brewing dish or receptacle, or other element capable of carrying the used pod or capsule, such as an ejection ring or the like, or an element associated with the first driving element, to or past some predetermined position or limit. This is preferably effected by a second latching or release mechanism. As a non-limiting example, this mechanism can be configured to release by contact with the brewing dish or associated structure that moves with it, at an appropriate location in its range of motion. The release of the energy of the second driving element will automatically quickly move the brewing dish or receptacle, or other element in the manner and direction for returning it to the brewing or preparation area.

After return of the brewing dish to its brewing area, the first and second driving element will be in an uncharged state, ready for recharging with energy, and the brewing dish, receptacle, or other element, will be positioned for receiving a new pod or capsule.

As a preferred embodiment, the driving elements are configured in a unitary or modular shuttle type mechanism, operable essentially in a linear manner, and utilize springs as the driving elements.

Thus, it is evident that by utilizing the apparatus and system of the invention, ejection of a used pod or capsule can be accomplished without need of powered apparatus such as a motor or the like, and without problems associated with operator actions such as referred to above.

BRIEF DESCRIPTION OF THE DRAWINGS

FIG. 11 is a combined top and perspective view of the apparatus and pod holding element, with the cover open;

FIG. 19 is a side view of the apparatus and pod holding element, showing the cover open, accompanied by top views and side views showing the pod holding element in a brewing position and orientation, and pivoted to a pod ejecting position;

DETAILED DESCRIPTION OF A PREFERRED EMBODIMENT OF THE INVENTION

Figure 1:
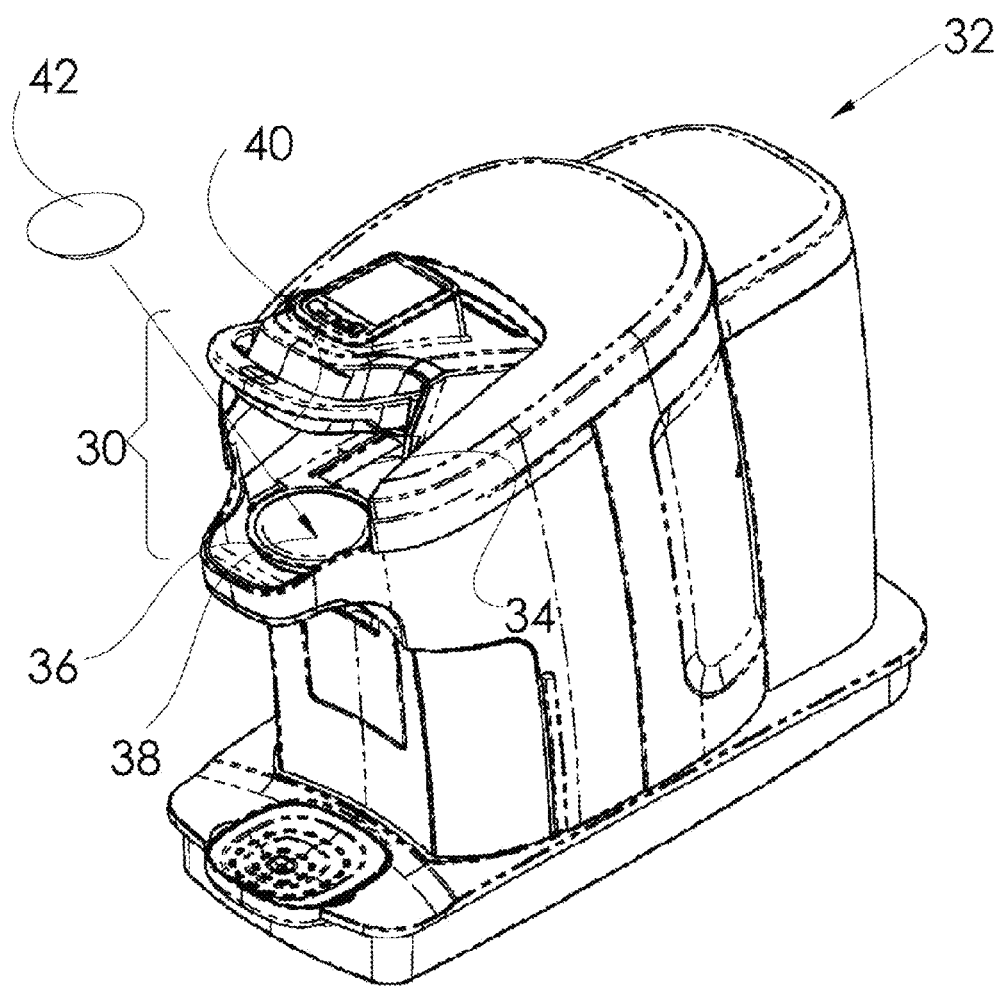
FIG. 1 is a perspective view of a representative beverage preparing machine including an apparatus and system operable according to a method of the invention for removing a beverage pod or capsule from a beverage brewing or preparing area of the machine.
Figure 2:
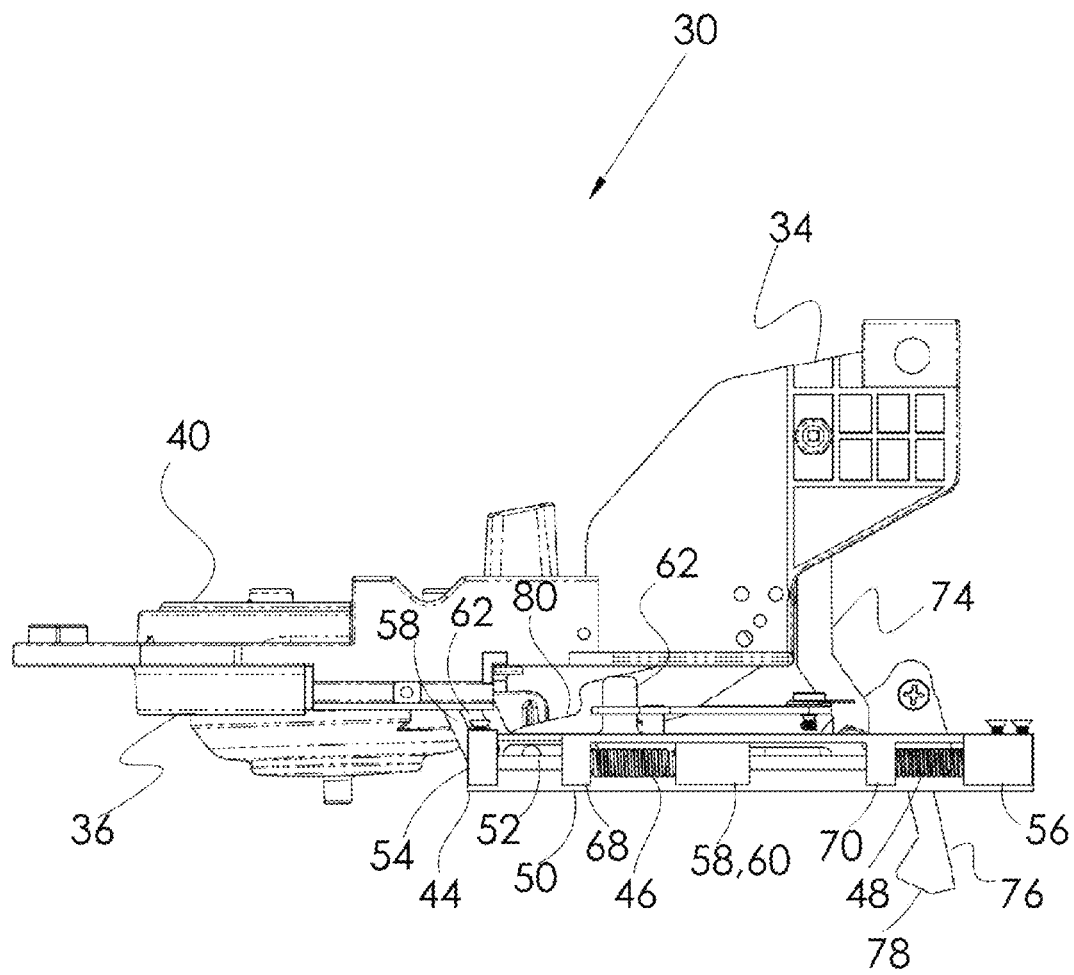
FIG. 2 is a side view of apparatus of the invention, showing a cover in a closed position enclosing a brewing chamber of the apparatus.
Figure 3:
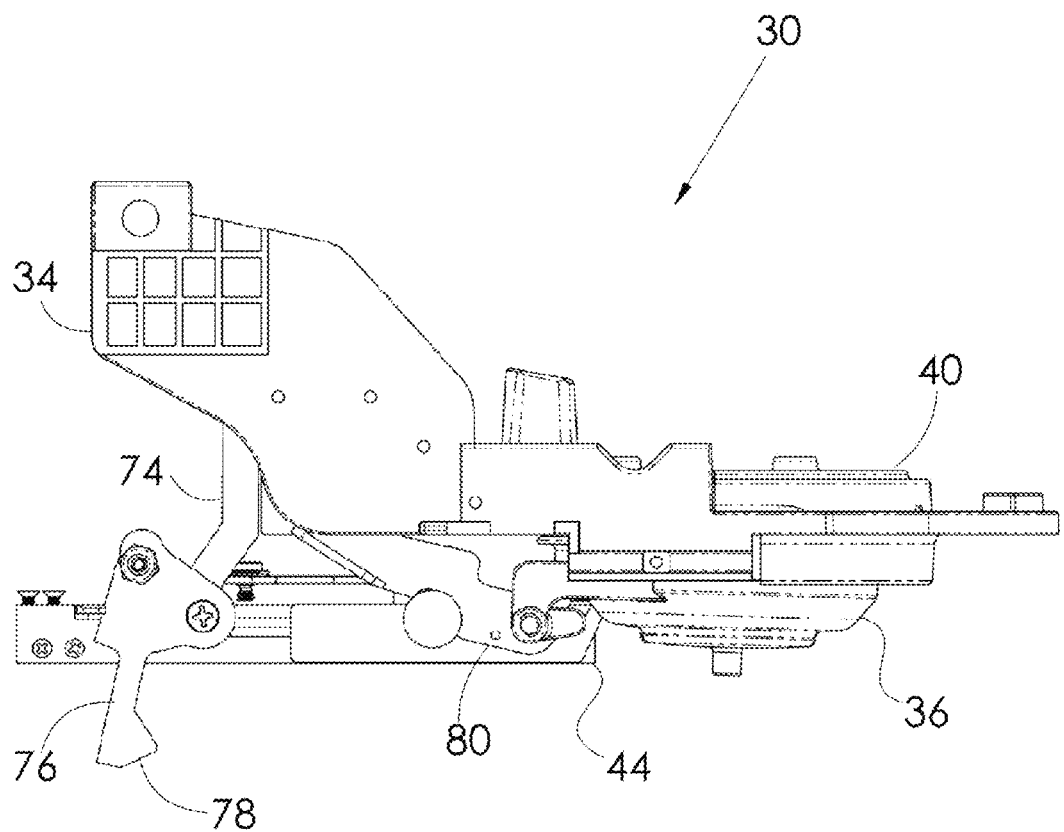
FIG. 3 is another side view of the apparatus.
Figure 4:
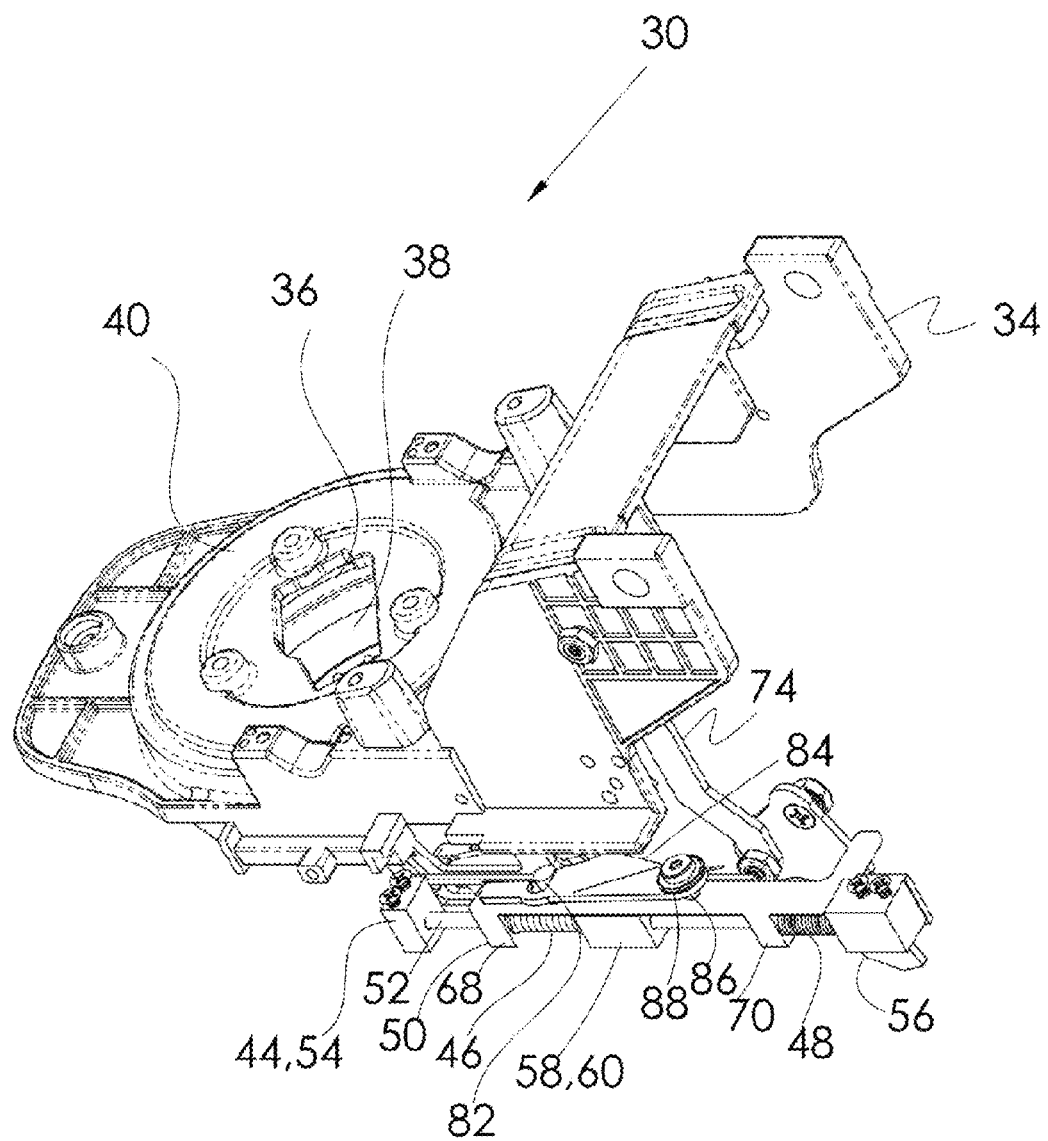
FIG. 4 is a perspective view of the apparatus.
Figure 5:
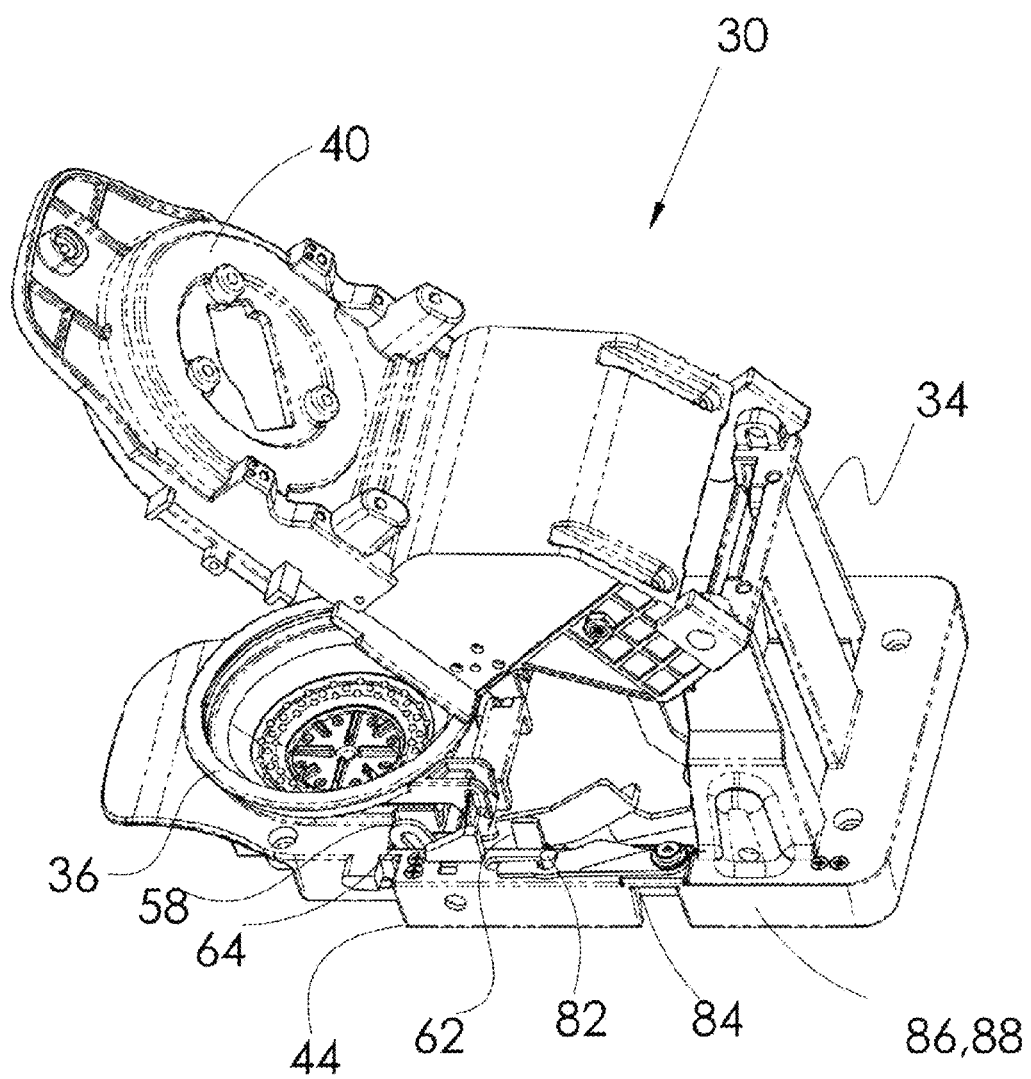
FIG. 5 is a perspective view of the apparatus with the cover open.
Figure 6:
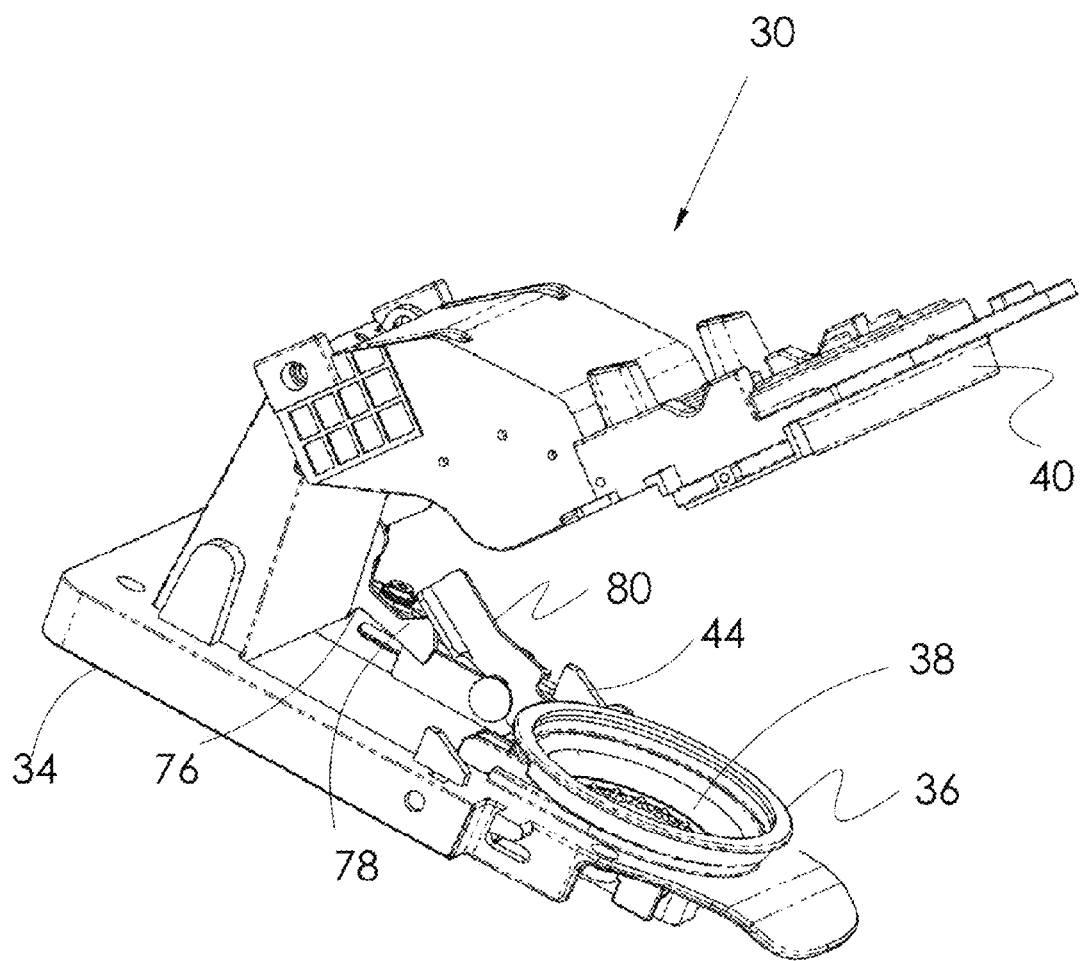
FIG. 6 is another perspective view of the apparatus with the cover open.
Figure 7:
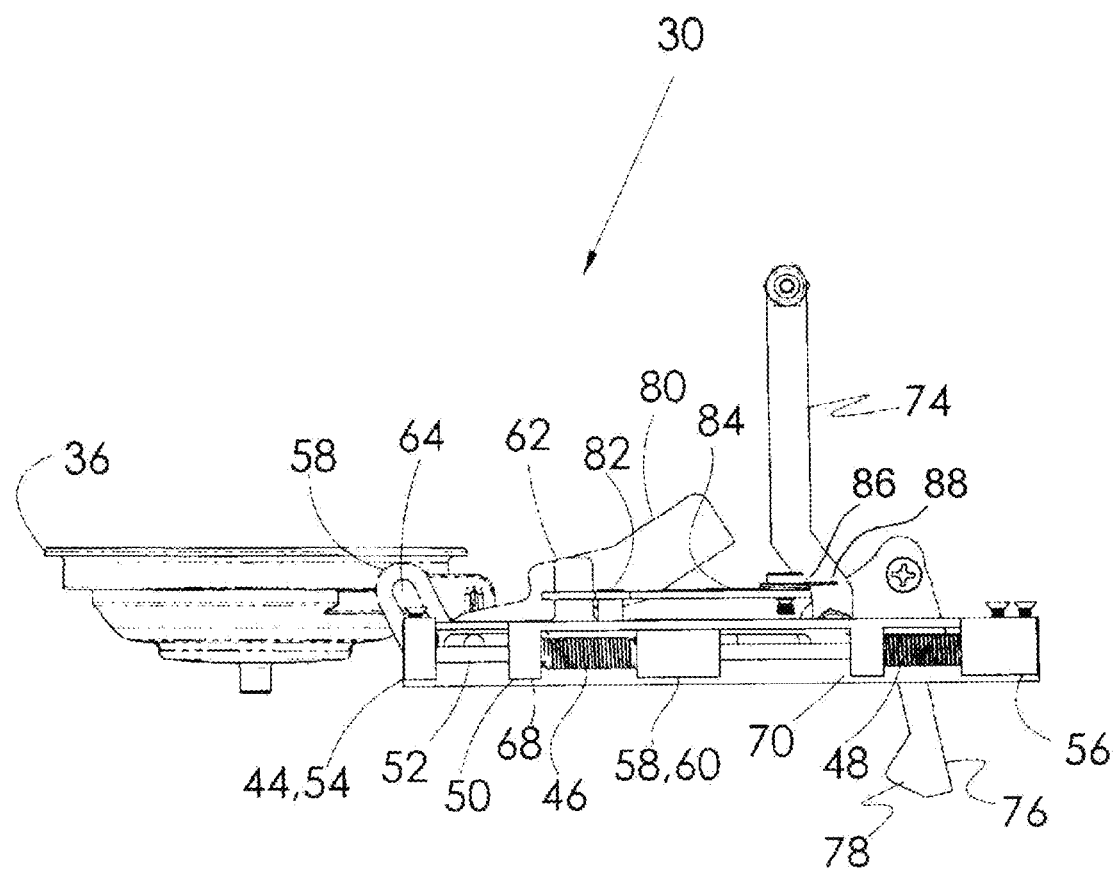
FIG. 7 is a side view of the apparatus supporting a pod holding element of the machine.
Figure 8:
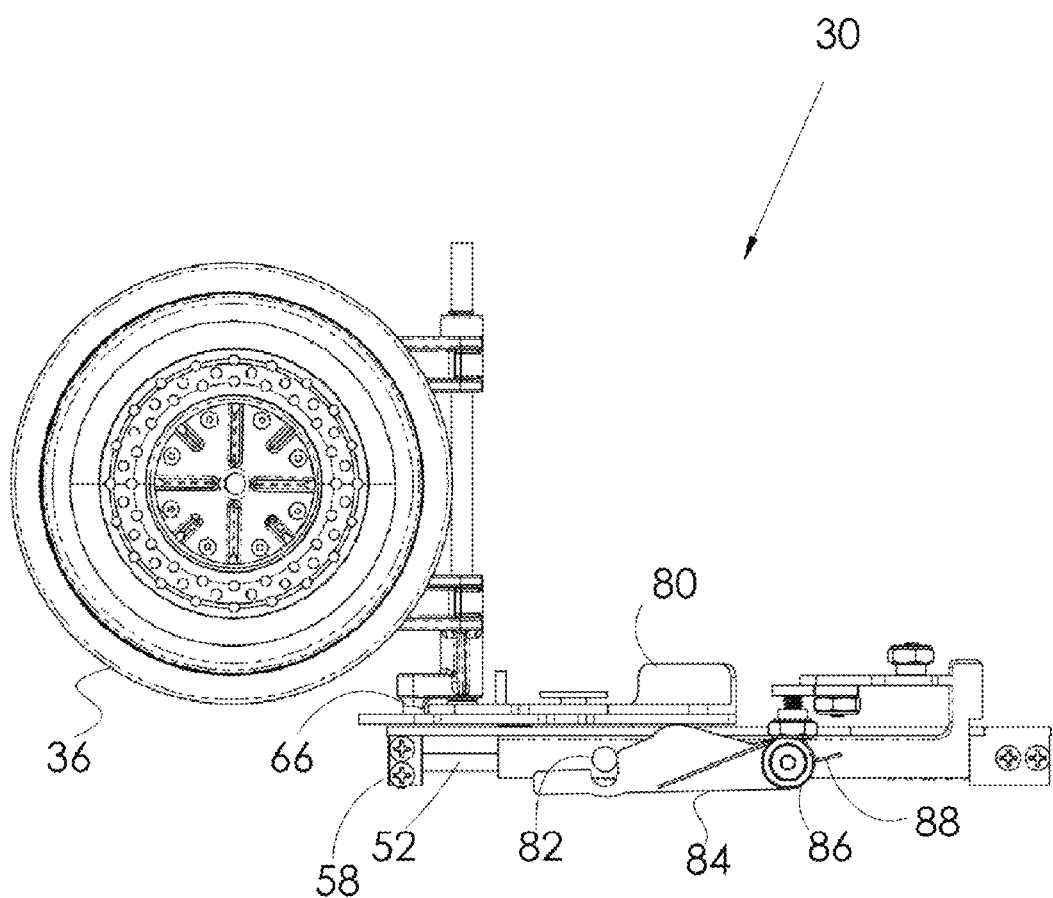
FIG. 8 is a top view of the apparatus and pod holding element.
Figure 20:
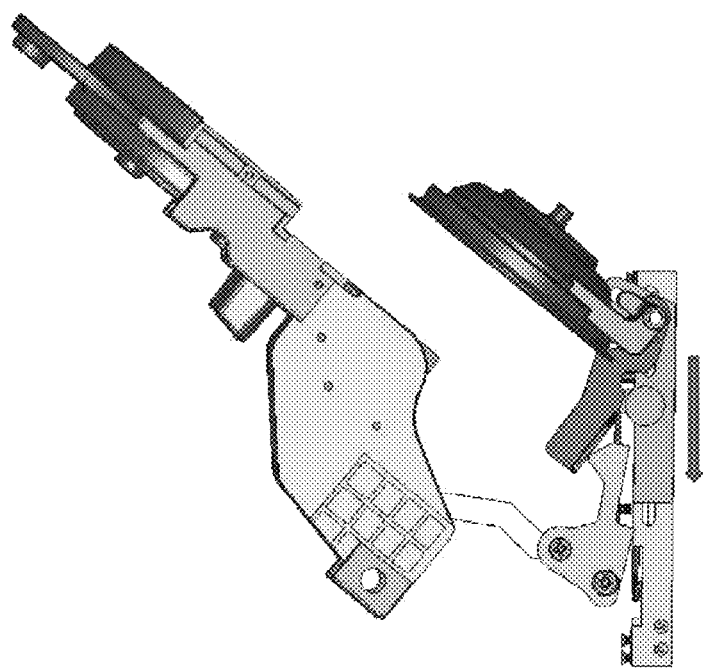
FIG. 20 is a side view of the apparatus with the cover open, and showing initial movement of the pod holding element.
Figure 21:
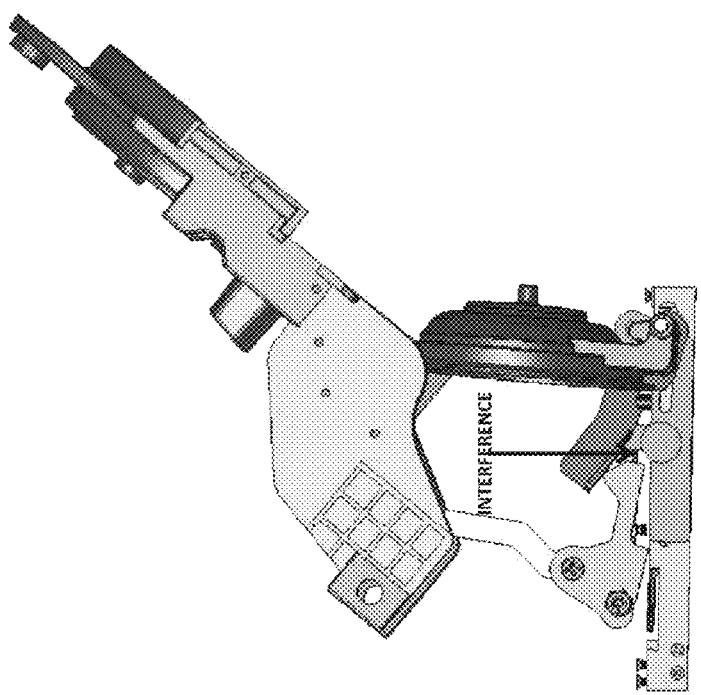
FIG. 21 is another side view of the apparatus the cover open, showing further movement of the pod holding element in a pod ejecting orientation.
Figure 22:
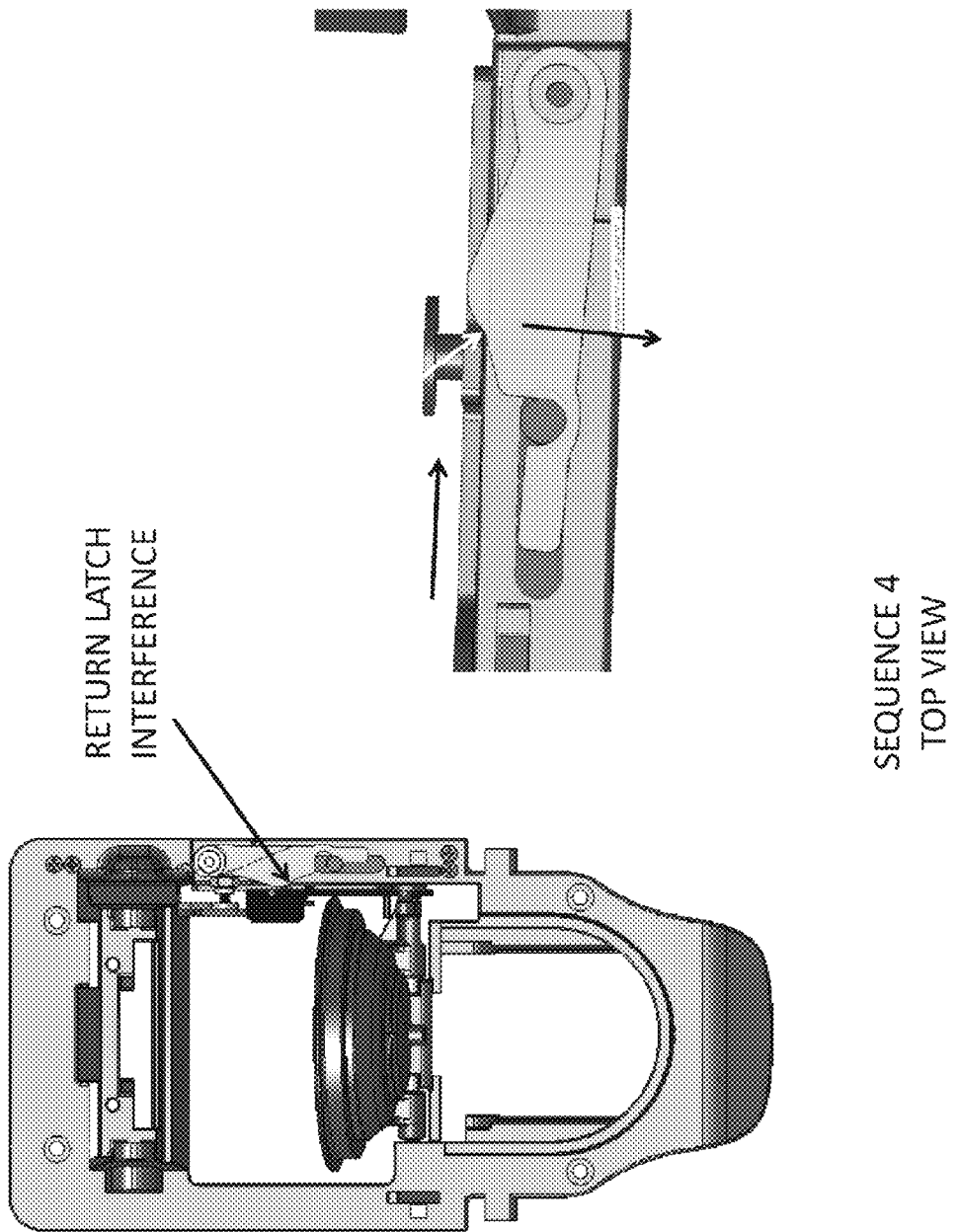
FIG. 22 is a top view of the apparatus showing the pod holding element in the pod ejecting orientation, and an enlarged side view showing a return latch of the apparatus.

In the drawings, numbered FIGS. 1-24, brewing apparatus 30 of a representative, non-limiting beverage brewing machine 32 for coffee, tea, and the like, is shown. The brewing apparatus 30 is representative of components of a variety of single serving brewing machines made and sold by Newco Enterprises, Inc. of St. Charles, Mo. USA. A more detailed description of similar brewing apparatus is contained in Webster et al, U.S. Pat. No. 8,490,542, and Ariete International Patent Application Publication Serial No. WO2007045553, both of which are hereby incorporated herein by reference in their entirety. The illustrated brewing apparatus 30 generally includes a frame 34 (FIGS. 1-6)

supporting a pod holding element 36, which here comprises a conventional brewing dish which comprises a lower portion or segment of a brewing chamber 38, and a cover 40 pivotably or hingedly supported and connected to the frame 34, which comprises the upper portion of the brewing chamber 38. The pod holding element 36 or dish is pivotable relative to the frame 34 between a horizontal brewing position (FIGS. 1-19, 23, 24), and a pod ejection position (FIGS. 20-22). The cover 40 is pivotable from an open or raised position (FIGS. 1, 5, 6, 11, 12, 13, 20, 21, 24), into covering relation to the pod holding element 36 to enclose the chamber 38 (FIGS. 2, 3, 4, 16). For brewing, a capsule or pod 42 (FIG. 1) containing brewable matter, e.g., coffee, tea, etc., will be laid on the pod holding element 36 before closing of the brewing chamber 38, in the well known manner.

Figure 9:
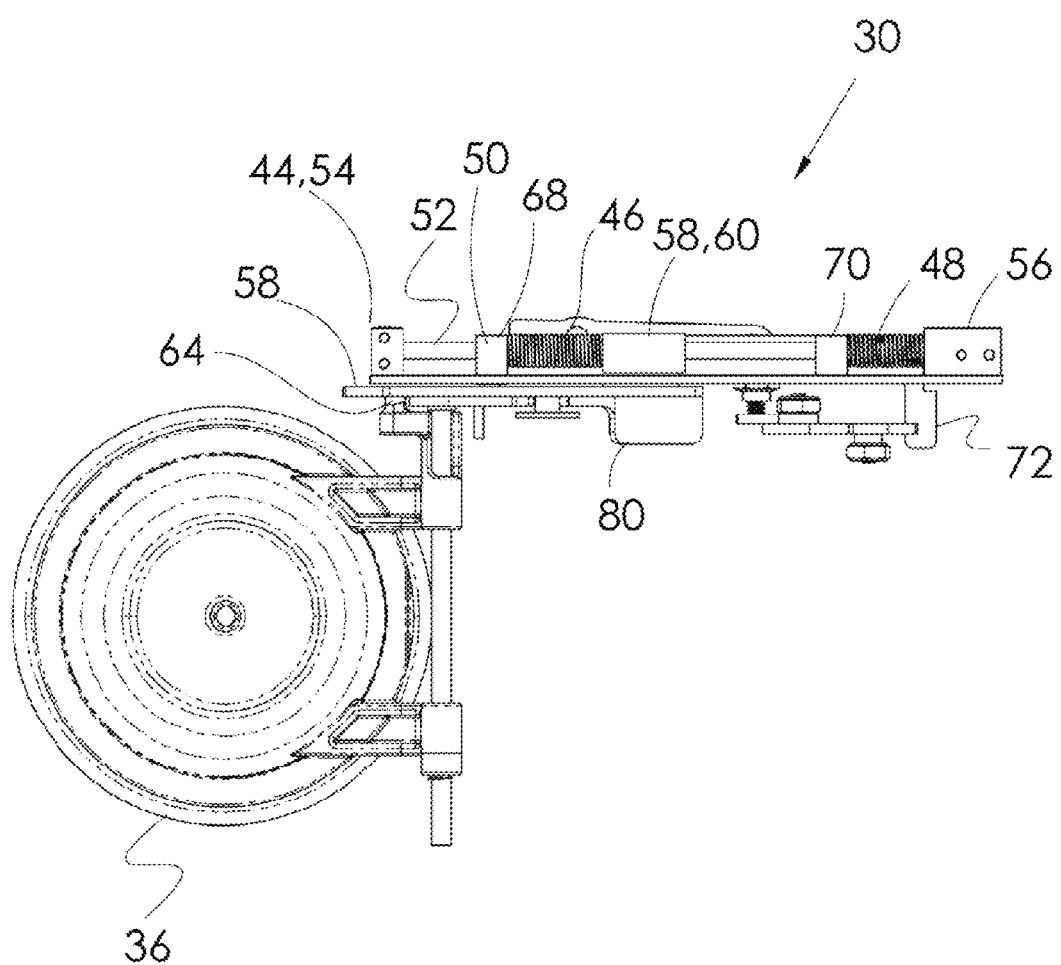
FIG. 9 is a bottom view of the apparatus and pod holding element.
Figure 10:
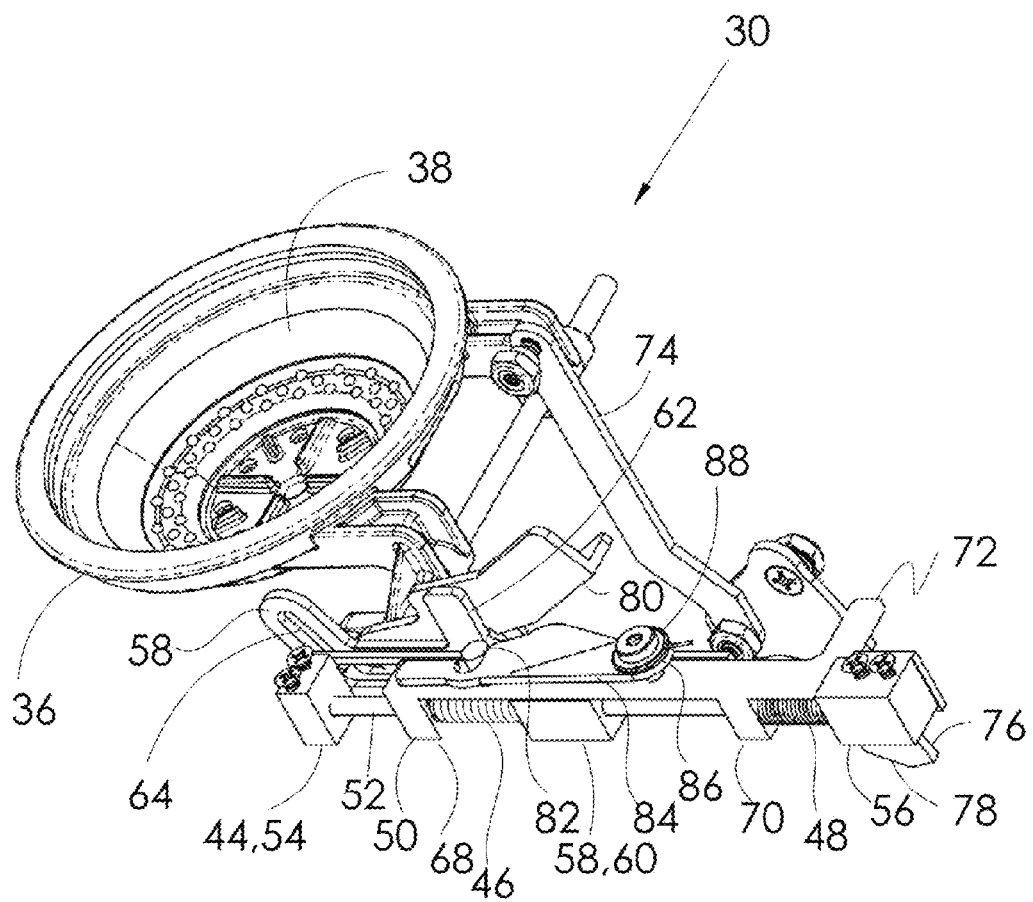
FIG. 10 is a perspective view of the apparatus and pod holding element.
Figure 12:
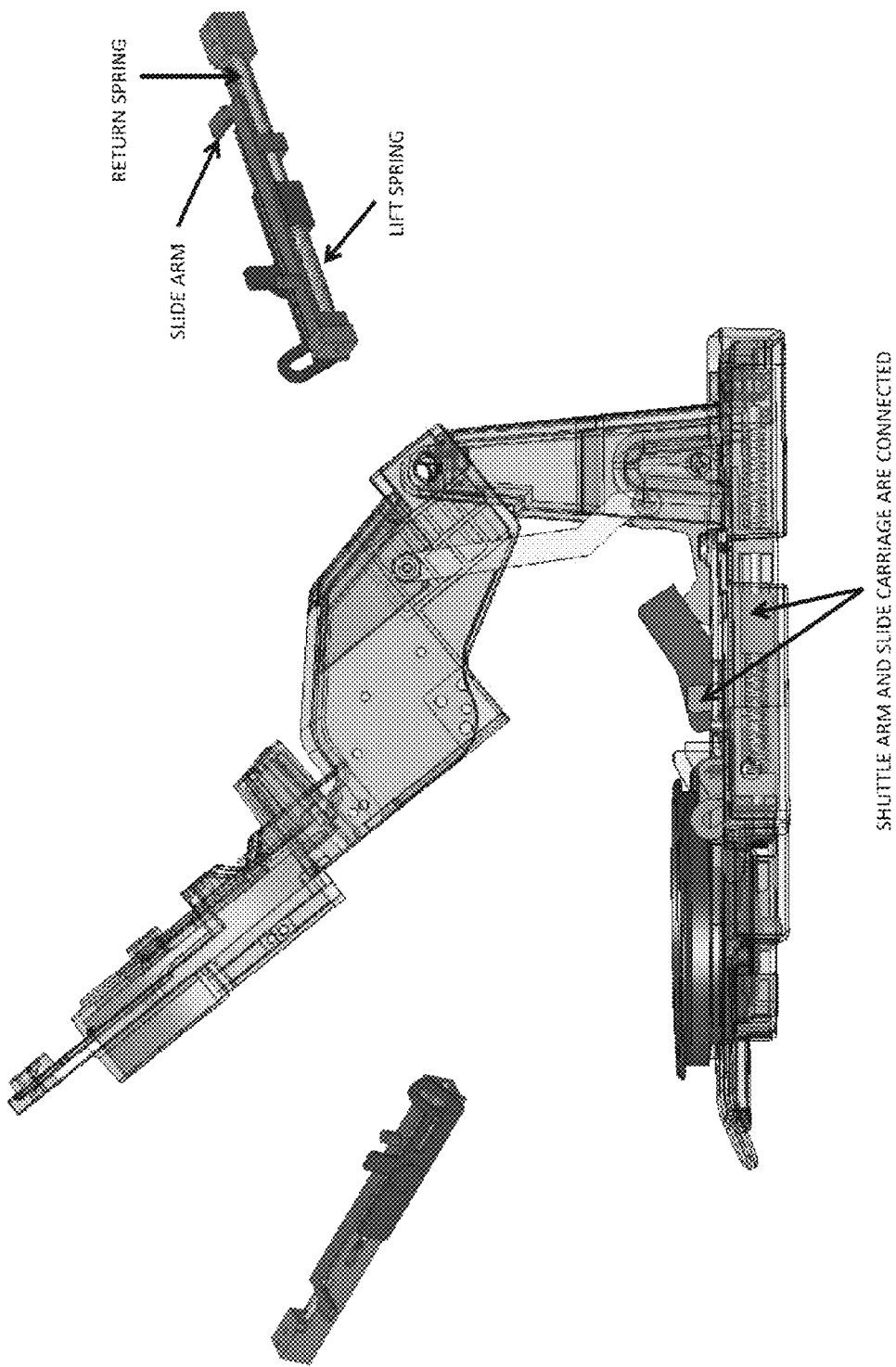
FIG. 12 is a side view of the apparatus and pod holding element with the cover open, and showing separately two perspective views of the shuttle arm and slide carriage of the apparatus.
Figure 13:
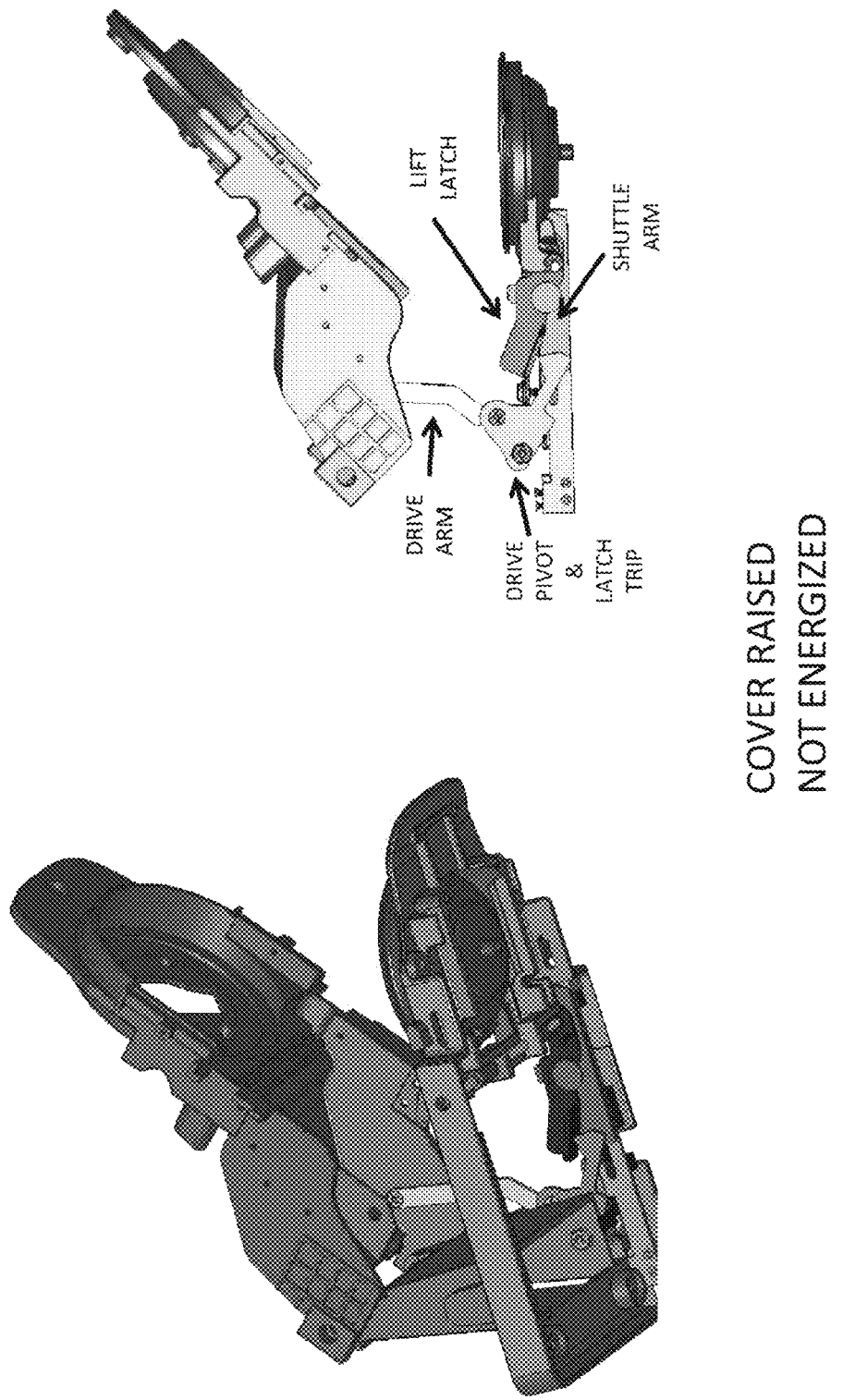
FIG. 13 is another perspective view of the apparatus and pod holding element with the cover open, accompanied by a side view thereof.
Figure 14:
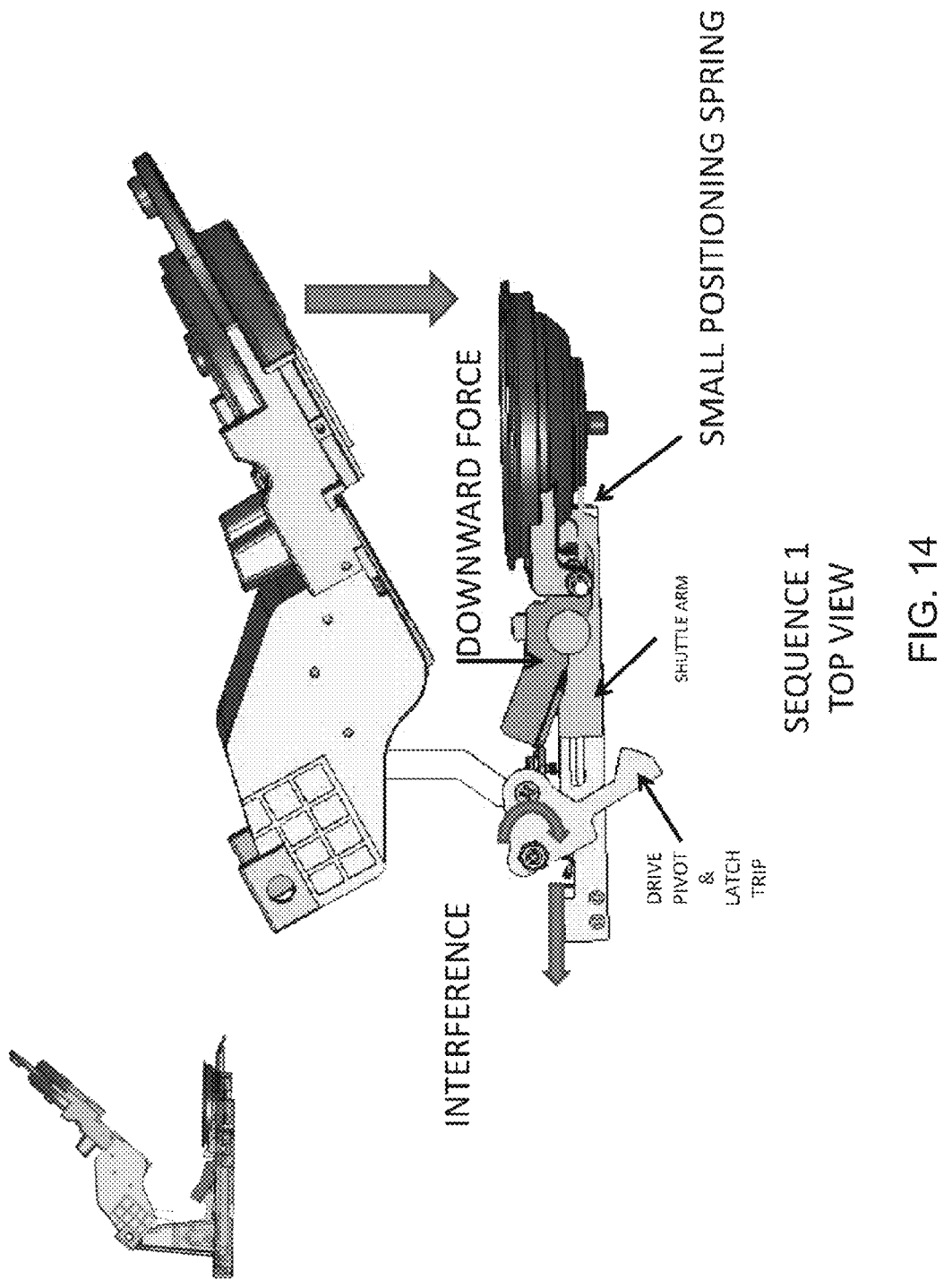
FIG. 14 is another side view of the apparatus and pod holding element, showing closing of the cover, accompanied by a side view the cover fully open.
Figure 15:
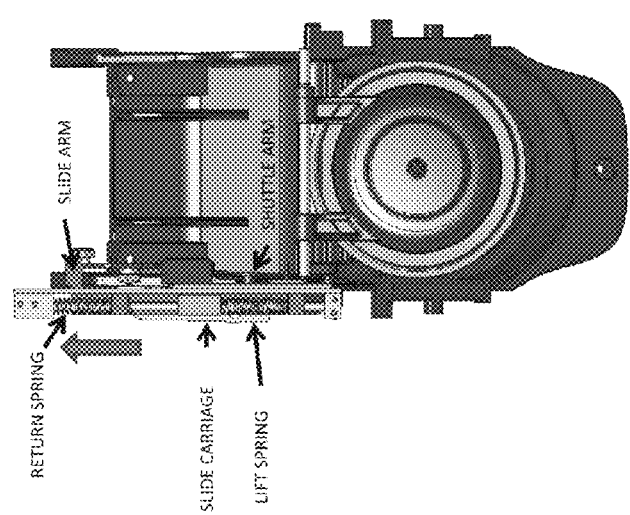
FIG. 15 is a bottom view of the apparatus and pod holding element.
Figure 16:
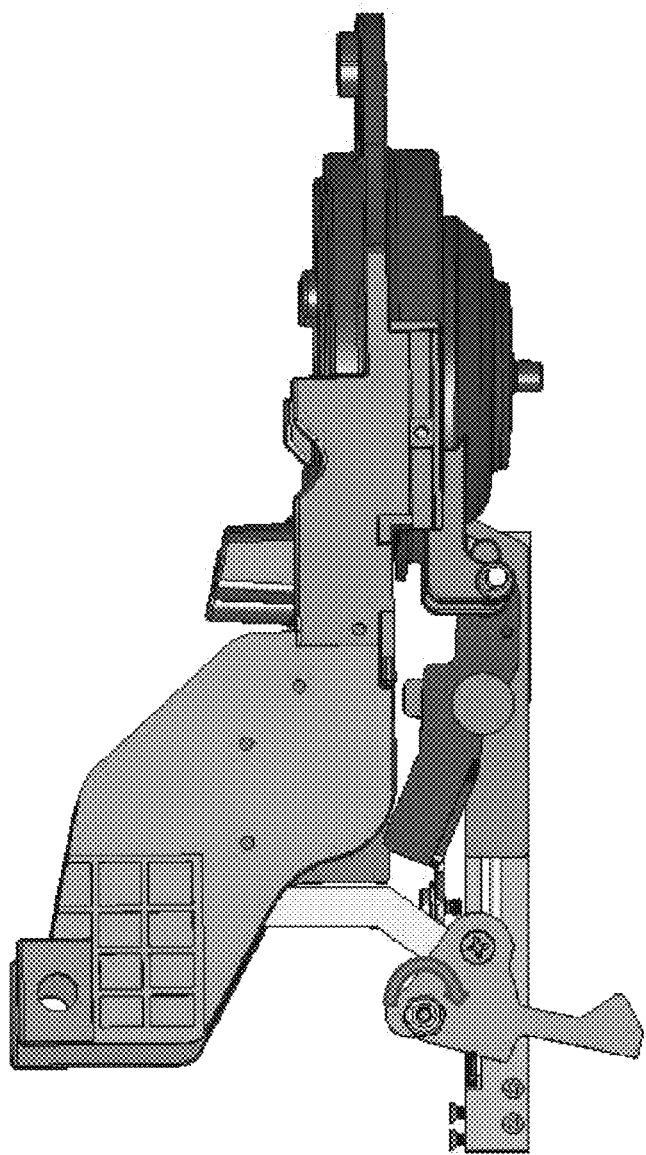
FIG. 16 is another side view of the apparatus and pod holding element, with the cover closed.
Figure 17:
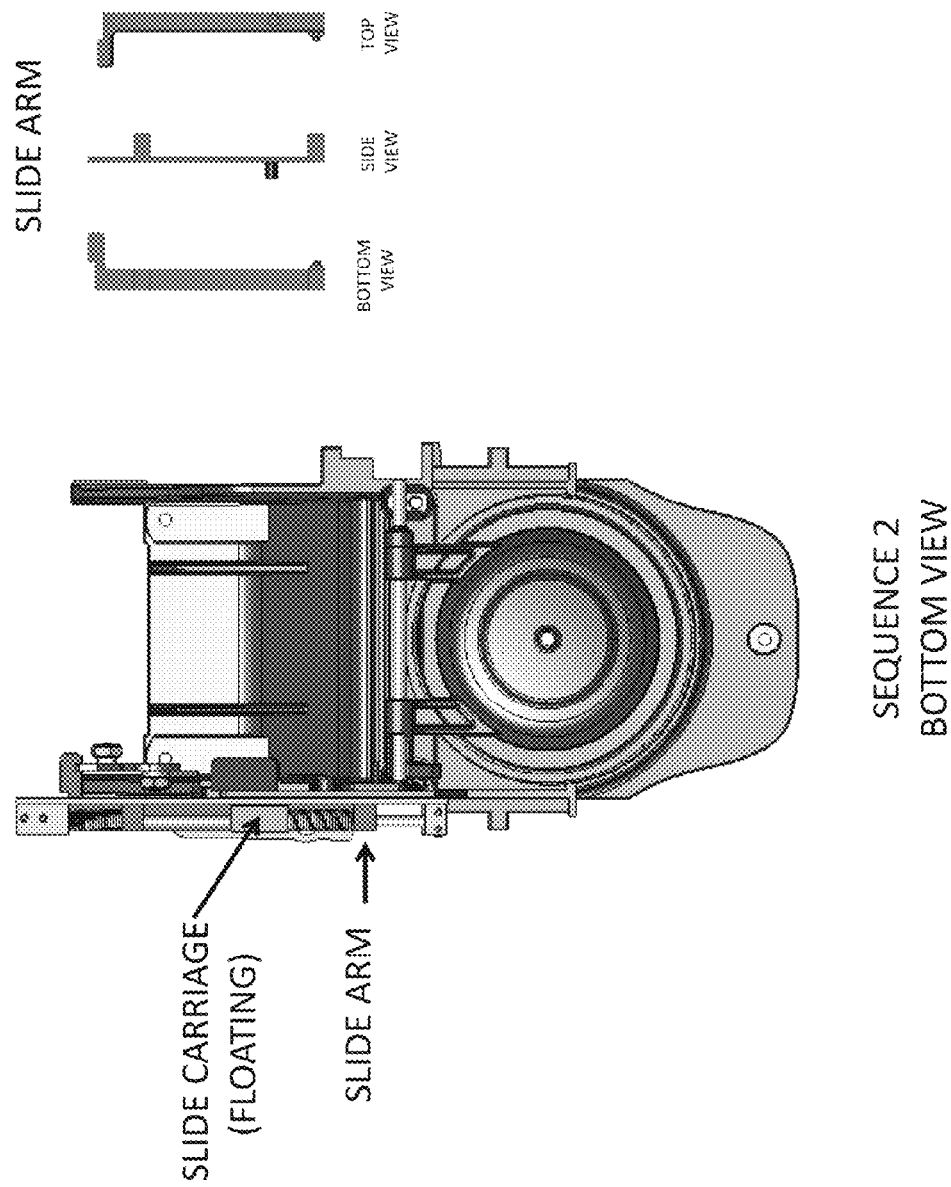
FIG. 17 is another bottom view of the apparatus and pod holding element with the cover closed, along with bottom, side, and top views of a slide arm of the apparatus.
Figure 18:
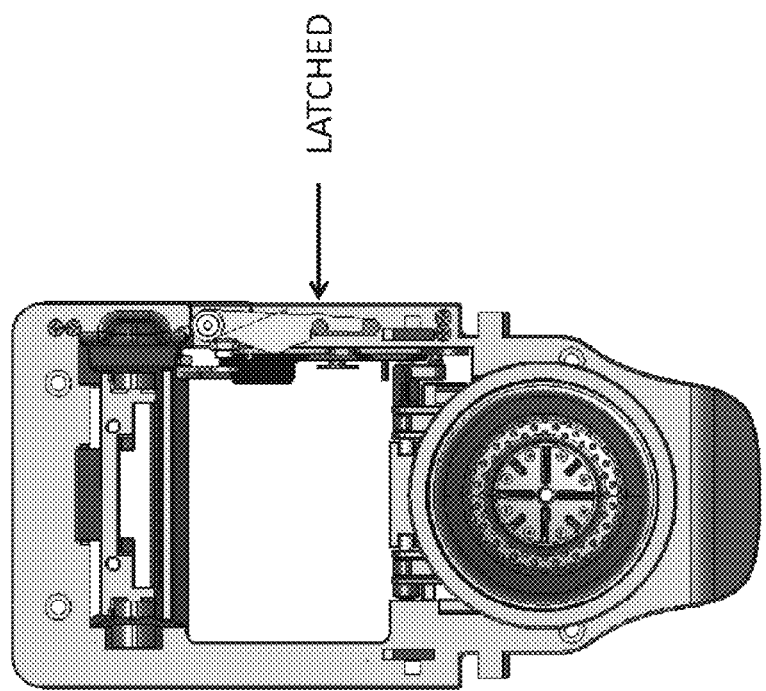
FIG. 18 is a top view of the apparatus and pod holding element, showing the slide arm latched.
Figure 23:
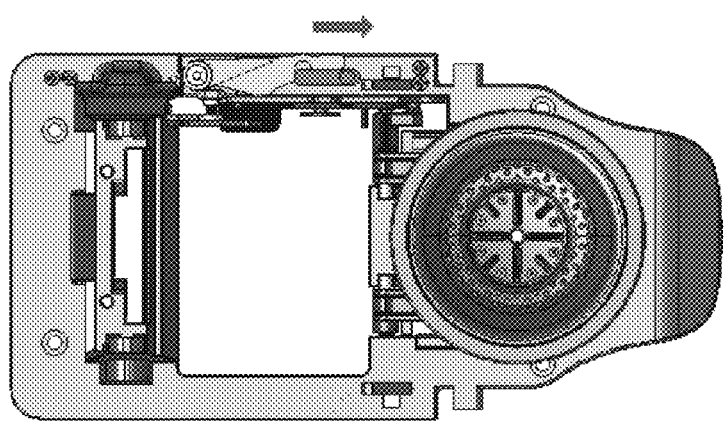
FIG. 23 is a top view of the apparatus, showing the pod holding element returned to the brewing area.
Figure 24:
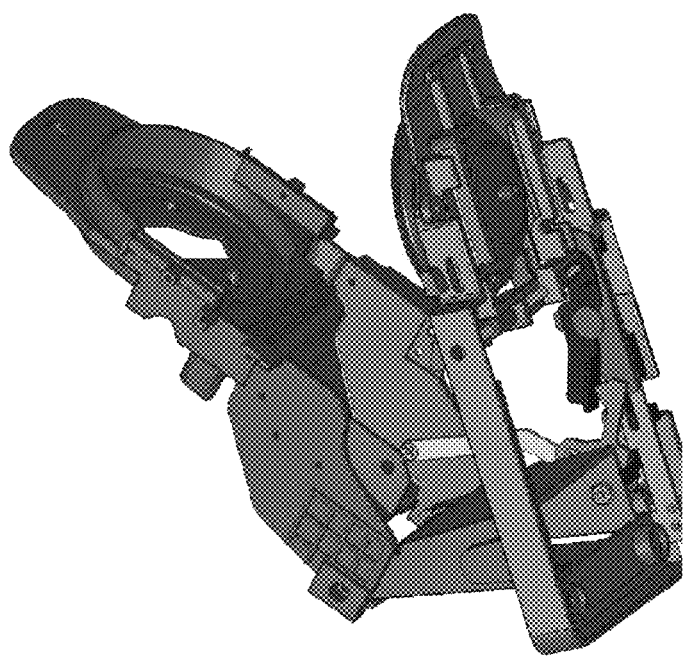
FIG. 24 is a perspective view of the apparatus, showing the pod holding element returned to the brewing area.

The apparatus 30 and system of the invention includes a mechanism 44 comprising a first driving element 46 which here is denoted as a lift spring, operable in the above described manner; a second driving element 48 which here is denoted as a return spring, incorporated into a shuttle assembly 50. Essentially, the driving elements 46, 48 (springs) are compression springs disposed about a guide rod 52 of the shuttle assembly 50 including spring retainers 54 and 56 at its opposite ends and fixed to a side of the frame 34. The driving elements 46, 48 or springs are separated by a shuttle 58 that is slidable along the rod 52. The shuttle 58 is part of a slide carriage 60 that additionally includes a shuttle arm 62 that projects upwardly, and an angled slot 64 that receives a pin 66 in connection with the pod holding element 36, such that when the slide carriage 60 moves backwards the pod holding element 36 or dish is pivoted upwardly and backwards, as shown and annotated in FIGS. 19-21, and when the slide carriage 60 is moved forwardly the pod holding element 36 or dish is pivoted back down, as shown in FIGS. 23 and 24. The shuttle arm 62 has spring compressors 68 and 70 engageable with ends of the driving elements 46 and 48, respectively, for compressing them simultaneously, and a sidewardly extending slide arm 72 (FIGS. 9 and 10). Essentially, the first driving element 46 (denoted in some of the FIGS. as lift spring) will be compressed against the shuttle 58 which will be restrained in position, to store energy, and the second driving element 48 (denoted in some of the FIGS. as return spring) will be compressed against the adjacent spring retainer 56 to store energy, both by movement of the shuttle arm 62 along the rod 52 toward the second driving element 48 (return spring). The shuttle arm 62 and shuttle 58 (with the slide carriage 60) are independently movable along the rod 52.

When the cover 40 is in the raised or open position, the driving elements 46, 48 (springs) are largely uncompressed and do not store adequate energy for the purposes of the invention. The cover 40 is held open by a suitable element or elements, e.g., by a torsion spring or springs in the well known manner. The cover 40 is connected to a downwardly extending drive arm 74. The drive arm 74 is connected to a drive pivot 76 and a latch trip 78. The drive pivot 76 is positioned to contact the sidewardly projecting slide arm 72. A lift latch 80 pivotally mounted on the frame 34 is positioned in engagement with the shuttle arm 62 to restrain it, the slide carriage 60 and the shuttle 58 along the rod 52 of the shuttle assembly 50.

When the cover 40 is lowered, e.g., by manual or automatic action and force, the drive arm 74 bears against the sidewardly projecting slide arm 72 to move the slide arm 72 backwards (in the direction toward the return spring), bringing the spring compressors 68, 70 against both the driving elements 46, 48 (lift and return springs), while the shuttle 58 of the slide carriage 60 remains stationary, restrained by the lift latch 80. As a result of the closing action of the cover 40, the two driving elements 46, 48 will be compressed to store sufficient motive energy, respectively, for operation according to the invention, for ejecting a pod or capsule, and returning the pod holding element 36 to the brewing position. The cover 40 will be locked in this position, and brewing can occur. This is best illustrated and annotated in FIGS. 14-16.

The slide arm 72 has a round boss 82 that projects upwardly and is engaged by a return latch 84 pivotally mounted on the frame by a pivot 86 and biased toward boss 82 by a positioning spring 88. This secures the slide arm 72 in position compressing the driving elements 46, 48, and at the same time the shuttle 58 and slide carriage 60 are locked in position also, in a position corresponding to the pod holding element 36 in the lowered or brewing position. This is best shown and annotated in FIGS. 17 and 18.

When the brewing chamber is opened by the raising of the cover 40, the drive pivot 76 and latch trip 78 are put into counter clockwise motion such that the latch trip 78 will contact the lift latch 80 to release the slide carriage 60 and shuttle 58. By this release, the first driving element 46 (lift spring) will be allowed to rapidly drive the slide carriage 60 and shuttle 58 backwards so that the pod holding element will be correspondingly pivoted upwardly and backward toward a pod ejection position by the action of the pin 66 in the slot 64 of the slide carriage 60. This sequence is best illustrated and annotated in FIGS. 19-21.

The interference contact between the slide carriage 60 and the return latch 84, causes the latch 84 to pivot relative to the frame 34 to release the slide arm 72. This is best illustrated and annotated by FIG. 22. The second driving element 48 (return spring) is now released by this action, to drive the shuttle 58 and slide carriage 60 forwardly in a rapid manner, to engage the slot 64 of the slide carriage 60 with the pin 66 in connection with the pod holding element 36 to rapidly pivot the pod holding element 36 back to the lower or brewing position. This is shown and annotated in FIGS. 23 and 24.

This reversing up and back and forward and down pivoting action of the pod holding element 36 is preferably accomplished rapidly, particularly the deceleration and reversal from the ejecting movement to the return movement, so that the pod or capsule carried thereon will be rapidly ejected from the pod holding element along a path, here backwardly, for disposal. At the end of this sequence, the motive energy of the driving elements 46, 48 is depleted and the cover 40 is in the open position, the pod holding element ready for receiving a new pod.

In light of all the foregoing, it should thus be apparent to those skilled in the art that there has been shown and described an apparatus, system, and method of ejecting or removing a beverage pod, capsule, package, cup, etc. from a beverage brewing or dispensing machine. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention.

Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. Apparatus for ejecting a beverage pod or capsule of a beverage preparing machine, comprising;
   a frame supporting a beverage pod holding element for movement in a predetermined manner between a first predetermined position and orientation in a beverage preparing area of the machine, and a second predetermined position and orientation in a disposal area;
   a mechanism associated with the frame, including at least one unpowered first driving element having a stored energy state storing a predetermined first quantity of motive energy when the beverage pod holding element is in the first predetermined position and orientation in the beverage preparing area, and an energy releasing state to release the stored energy in a manner to forcefully drive the beverage pod holding element from the beverage preparing area toward the disposal area in a manner to eject a beverage pod or capsule from the beverage holding element, the mechanism including at least one second driving element having a stored energy state storing a predetermined second quantity of motive energy when the at least one first driving element is in the energy releasing state, and an energy releasing state to release the second quantity of motive energy in a manner to return the beverage pod holding element from the disposal area to the beverage preparing area; and
   a latching mechanism configured to hold the at least one first driving element in the stored energy state thereof when the beverage pod holding element is in the beverage preparing area, and to hold the at least one second driving element in the stored energy state thereof when the beverage pod holding element is in the beverage preparing area and when moving toward the disposal area, the latching mechanism being configured to respond to a predetermined action or condition, to automatically release the at least one first driving element to release the stored first quantity of motive energy to forcefully drive the beverage pod holding element from the beverage preparing area toward the disposal area, and to then automatically release the at least one second driving element to release the second quantity of motive energy to automatically return the beverage pod holding element from the disposal area to the beverage preparing area, such that a beverage pod or capsule carried on the beverage pod holding element will be ejected at the disposal area.

2. The apparatus of claim 1, comprising a cover supported by the frame for movement from an open position into a closed position in covering relation to the beverage pod holding element to form a beverage preparing chamber therebetween, and a drive arm connecting the cover to the mechanism in a manner such that movement of the cover into the closed position will cause the at least one first driving element to store the first quantity of motive energy and the at least one second driving element to store the second quantity of motive energy.

3. The apparatus of claim 2, wherein the at least one first driving element comprises at least one spring, the at least one second driving element comprises at least one spring, and the drive arm is configured to cause compression of the springs when the cover is moved toward the closed position.

4. The apparatus of claim 3, comprising a slide arm positioned and configured to be driven by the drive arm to compress the springs along a rod, the springs being separated by a shuttle restrained at a predetermined location along the rod, the shuttle connected to a slide carriage, and the shuttle and the slide carriage when unrestrained being movable relative to the rod by the release of the stored first quantity of motive energy to drive the beverage pod holding element from the beverage preparing area toward the disposal area.

5. The apparatus of claim 4, wherein the shuttle and the slide carriage are caused to be unrestrained by movement of the cover from the closed position.

6. The apparatus of claim 4, wherein the slide arm is movable by the movement of the shuttle and the slide carriage to a certain location, to automatically cause the at least one second driving element to release the second quantity of motive energy to automatically reverse the movement of the beverage pod holding element to eject a beverage pod or capsule carried thereby in the disposal area.

7. The apparatus of claim 4, comprising a pinned connection between the beverage pod holding element and the slide carriage configured to effect the movement of the beverage pod holding element from the beverage preparing area toward the disposal area as an upward pivoting and generally horizontal movement.

8. Apparatus for ejecting a beverage pod or capsule from a beverage preparation area of a beverage preparing machine, comprising;
   a cover supported for movement in a predetermined manner between an open position spaced from a pod holding element supported in a predetermined position and orientation in a beverage preparing area of the machine, and a closed position covering the pod holding element to define and bound a beverage preparing chamber therebetween;
   a mechanism connected to the cover and the pod holding element, comprising:
      at least one unpowered first driving element configured for storing a predetermined first quantity of motive energy;
      at least one unpowered second driving element configured for storing a predetermined second quantity of motive energy; and
   a mechanism associated with the cover and the driving elements and including elements configured to exert forces against the driving elements to cause the storing of the first and second quantities of motive energy thereby, respectively, when the cover is moved to the closed position, and elements configured to automatically cause the at least one first driving element to release the first quantity of motive energy to rapidly move the pod holding element from the beverage preparing area in a predetermined manner, and then to automatically cause the at least one second driving element to release the second quantity of motive energy to rapidly return the pod holding element to the beverage preparing area, in a manner to dispose of a beverage pod or capsule held by the pod holding element.

9. The apparatus of claim 8, wherein the at least one first driving element and the at least one second driving element comprise springs, and the mechanism comprises a drive arm associated with the cover and the springs and movable to compress the springs when the cover is moved toward the closed position.

10. The apparatus of claim 9, wherein the mechanism comprises a slide arm positioned and configured to be driven by the drive arm to compress the springs along a rod, the springs being separated by a shuttle restrained at a predetermined location along the rod, the shuttle connected to a slide carriage, and the shuttle and the slide carriage being movable relative to the rod by the release of the first quantity of motive energy to drive the pod holding element from the beverage preparing area.

11. The apparatus of claim 10, wherein the slide arm is movable by the movement of the shuttle and the slide carriage to a certain location, to automatically cause the at least one second driving element to release the second quantity of motive energy to automatically reverse the movement of the beverage pod holding element to eject a beverage pod or capsule carried thereby.

12. The apparatus of claim 10, comprising a pinned connection between the pod holding element and the slide carriage configured to effect the movement of the pod holding element from the beverage preparing area as an upward pivoting and generally horizontal movement.

13. Apparatus for ejecting a pod or capsule of a beverage brewing or dispensing machine, comprising:
a mechanism that will automatically release a predetermined first quantity of stored motive energy from a first spring of the mechanism responsive to an operator action, to automatically rapidly move an element holding the pod or capsule from a brewing or beverage preparing area of the machine, then automatically release a predetermined second quantity of stored motive energy from a second spring of the mechanism, in a predetermined manner to eject the pod or capsule and return the element absent the pod or capsule to the brewing or beverage preparing area.

14. The apparatus of claim 13, wherein the mechanism comprises a drive arm associated with a cover and the springs and movable to compress the springs when the cover is moved toward the element holding the pod or capsule.

15. The apparatus of claim 13, wherein the operator action comprises moving the cover from the element holding the pod or capsule.

16. The apparatus of claim 14, wherein the mechanism comprises a slide arm positioned and configured to be driven by the drive arm to compress the springs along a rod, the springs being separated by a shuttle restrained at a predetermined location along the rod, the shuttle connected to a slide carriage, and the shuttle and the slide carriage being movable relative to the rod by the release of the first quantity of motive energy to drive the element holding the pod or capsule from the brewing or beverage preparing area.

17. The apparatus of claim 16, wherein the slide arm is movable by the movement of the shuttle and the slide carriage to a certain location, to automatically cause the second spring to release the second quantity of motive energy to automatically reverse the movement of the element holding the pod or capsule to eject the pod or capsule.

18. The apparatus of claim 16, comprising a pinned connection between the element holding the pod or capsule and the slide carriage configured to effect the movement of the element holding the pod or capsule from the beverage preparing area as an upward pivoting and generally horizontal movement.

* * * * *